United States Patent [19]
Chadha et al.

[11] Patent Number: 5,788,881
[45] Date of Patent: Aug. 4, 1998

[54] VISIBLE LIGHT-EMITTING PHOSPHOR COMPOSITION HAVING AN ENHANCED LUMINESCENT EFFICIENCY OVER A BROAD RANGE OF VOLTAGES

[75] Inventors: Surjit S. Chadha; Charles M. Watkins, both of Meridian, Id.

[73] Assignee: Micron Technology, Inc., Boise, Id.

[21] Appl. No.: 548,202

[22] Filed: Oct. 25, 1995

[51] Int. Cl.$^6$ .......................... H01J 29/20; C09K 11/00
[52] U.S. Cl. .................... 252/301.4 R; 252/301.45; 252/301.4 F; 252/301.4 H; 252/301.6 R; 252/301.65; 252/301.6 F; 313/467; 313/468
[58] Field of Search .................... 313/467, 468; 252/301.4 R, 301.6 R, 301.6 S, 301.6 P, 301.6 F, 301.4 S, 301.4 F, 301.6 H

[56] References Cited

U.S. PATENT DOCUMENTS

| | | | |
|---|---|---|---|
| 3,243,625 | 3/1966 | Levine et al. | 313/468 |
| 3,449,259 | 6/1969 | Ropp | 252/301.4 R |
| 4,119,562 | 10/1978 | Kagami et al. | 252/301.6 S |
| 4,275,333 | 6/1981 | Kagami et al. | 252/301.4 R |
| 4,303,913 | 12/1981 | Tohda et al. | 313/467 |
| 4,551,397 | 11/1985 | Yaguchi et al. | 252/301.6 P |
| 4,874,985 | 10/1989 | Hase et al. | 252/301.6 S |
| 4,894,583 | 1/1990 | Berkstresser et al. | 313/468 |
| 4,924,139 | 5/1990 | Morita et al. | 313/468 |
| 4,925,593 | 5/1990 | Borchardt et al. | 252/301.6 S |
| 5,115,306 | 5/1992 | Tsuda et al. | 358/60 |
| 5,185,553 | 2/1993 | Tang et al. | 313/468 |
| 5,229,331 | 7/1993 | Doan et al. | 437/228 |
| 5,232,549 | 8/1993 | Cathey et al. | 456/633 |
| 5,369,331 | 11/1994 | Mizukami et al. | 252/301.6 S |

FOREIGN PATENT DOCUMENTS

| | | | |
|---|---|---|---|
| 52-18482 | 2/1977 | Japan | 252/301.6 R |
| 52-28861 | 3/1977 | Japan | 313/467 |
| 52-30277 | 3/1977 | Japan | . |
| 54-12271 | 5/1979 | Japan | 252/301.6 R |

OTHER PUBLICATIONS

Chem. Abstract citation 68:44070, Gilliland et al, "Cathodoluminescent Phosphor with High–Intensity Ultraviolet Emission", US NTIS, AD rep., 657589 143, 1967.

Dharmadhikari, D. M., et al., Abstract: "Structural Study of $ZnY_2O_4$", Indian J. Phys. 53A, 459–460 (1979).

Narita, K. et al., "Behavior of Phosphors Under Low Voltage Cathode Ray Excitation", J. Electrochem. Soc.: Solid State Science and Technology, 1794–1798 (1980).

Ozawa, "Preparation of $Y_2O_2S$:Eu Phosphor Particles of Different Sizes by a Flux Method," J. Electrochem. Soc., 124(3), 413–417 (1977).

Yan et al., "Preparation of $Y_3Al_5O_{12}$–Based Phosphor Powders," J. Electrochem. Soc., 134(2), 493–498 (1987), no month.

Primary Examiner—Melissa Bonner
Attorney, Agent, or Firm—Mueting, Raasch & Gebhardt, P.A.

[57] ABSTRACT

A phosphor composition selected from a range of phosphor compositions is provided for discharging spent electrons from a display screen of a luminescent display. The selected phosphor composition is a mixture of phosphor species, including a dielectric phosphor species capable of emitting visible green, blue or red light when subjected to excitation electrons at a relatively high voltage and a conductive phosphor species capable of emitting visible green, blue or red light when subjected to energized excitation electrons at a relatively low voltage. The display screen of the luminescent display is coated with the selected phosphor composition to form a cathodoluminescent layer on the screen. The cathodoluminescent layer is then selectively subjected to excitation electrons having a voltage within a predetermined broad range. The excitation electrons impart their energy to the phosphor composition causing it to emit visible green, blue or red light, thereby creating an image on the screen. The conductive phosphor species of the phosphor composition subsequently conducts the resulting spent electrons to the anode of the screen where the spent electrons are discharged.

27 Claims, 2 Drawing Sheets

VISIBLE LIGHT-EMITTING PHOSPHOR COMPOSITION HAVING AN ENHANCED LUMINESCENT EFFICIENCY OVER A BROAD RANGE OF VOLTAGES

This invention was made with Government support under Contract No. D4BT63-93-C-0025 awarded by Advanced Research Projects Agency (ARPA). The Government has certain rights in this invention.

TECHNICAL FIELD

The present invention relates generally to phosphors having utility in luminescent display applications, and more particularly to a phosphor composition having utility in such applications that emits visible light and has enhanced efficiency across a broad range of operating voltages.

BACKGROUND OF THE INVENTION

Luminescent materials, termed phosphors, have general utility in luminescent displays. A phenomenon common to all phosphors is their ability to emit photons that are visible to the human eye when the phosphors are excited to elevated energy levels. One excitation technique employed in many luminescent displays, including cathode ray tubes, vacuum fluorescent displays, and field emission displays, projects electrons through a vacuum onto a display screen containing the phosphors from an electron-emitting cathode positioned proximal to the display screen. The display screen has a glass substrate coated with a layer of the luminescent phosphors and a layer of a conductive material that serves as an anode. When the cathode is activated, the electrons travel from the cathode to the anode causing incident electrons to strike the intervening phosphor layer. The incident electrons are reflected, scattered or absorbed by the phosphors, thereby transferring energy to the phosphors; exciting the phosphors and advantageously causing them to emit visible light.

If the energy of the incident electrons is greater than a few tens of electronvolts, the incident electrons can also create a large number of secondary electrons within the phosphor layer. Some of these secondary electrons can escape the surface of the phosphor layer back into the vacuum, if the secondary electrons have sufficient energy to overcome the work function. The escaping secondary electrons can undesirably cause the floating surface of the phosphor layer to shift its potential when the number of secondary electrons escaping the surface of the phosphor layer exceeds the number of incident electrons striking the surface. A reduction in the potential of the phosphor layer results in a negative charge buildup on the screen that seriously diminishes the light output of the phosphors, producing unstable emissions thereof.

This problem is obviated in cathode ray tubes by aluminising the screen with an aluminum film to discharge spent electrons from the screen and reduce the negative charge buildup thereon. Aluminisation cannot be employed in field emission displays or vacuum fluorescent displays, however, because, unlike cathode ray tubes, the accelerating voltages of emitted electrons in field emission displays and vacuum fluorescent displays are generally relatively low and aluminum films typically absorb incident electrons having energies below 2 keV. An alternate solution to the problem of negative charge buildup on display screens is to integrate an inert non-luminescent conductor such as indium oxide within the phosphor layer of the screen. The inert conductor effectively discharges the spent electrons from the phosphor layer reducing the negative charge buildup on the screen. Unfortunately, the inert conductor dilutes the phosphor concentration of the phosphor layer, thereby diminishing its inherent luminescent efficiency and correspondingly diminishing the quality of the image produced by the display.

As such, a need exists for a display screen having utility in a luminescent display that effectively discharges spent electrons from the screen without unduly diminishing the inherent luminescent efficiency of the device. Accordingly, it is an object of the present invention to provide a phosphor composition for coating a screen of a luminescent display that has a relatively high luminescent efficiency over a broad range of operating voltages. It is another object of the present invention to provide a phosphor composition for coating a screen of a luminescent display that effectively discharges spent electrons therefrom without unduly diminishing the relatively high inherent luminescent efficiency of the display or the quality of the display image. It is yet another object of the present invention to provide a display screen device for a luminescent display that effectively discharges spent electrons from the screen without unduly diminishing the inherent luminescent efficiency of the display. It is still another object of the present invention to provide a process for effectively discharging spent electrons from a display screen of a luminescent display without unduly diminishing the inherent luminescent efficiency of the display. These objects and others are accomplished in accordance with the invention described hereafter.

SUMMARY OF THE INVENTION

The present invention is a selected phosphor composition, a display screen device for a luminescent display, and a process for discharging spent electrons from a display screen device. The selected phosphor composition is a mixture of phosphor species, including a dielectric phosphor species capable of emitting visible green, blue or red light when subjected to energized excitation electrons at a relatively high voltage and a conductive phosphor species capable of emitting visible green, blue or red light when subjected to energized excitation electrons at a relatively low voltage. The device and process comprise coating a display screen of a conventional luminescent display, such as a field emission display or a vacuum fluorescent display, with the selected phosphor composition to form a cathodoluminescent layer on the screen. The cathodoluminescent layer is then selectively subjected to excitation electrons having a voltage within a predetermined broad range. The excitation electrons impart their energy to the phosphor composition of the cathodoluminescent layer causing the phosphor composition to emit the visible green, blue or red light in accordance with a desired pattern, thereby creating an image on the screen. Thereafter, the conductive phosphor species of the phosphor composition conducts the resulting spent electrons through the cathodoluminescent layer to an anode layer also coating the screen where the spent electrons are discharged away from the screen.

It has been found that the composition, device and process of the present invention prolong the useful life of a luminescent display by effectively discharging spent electrons away from the display screen. At the same time, the composition, device and process provide the display with an enhanced image because substantially the entire cathodoluminescent layer comprises active phosphor species that emit visible light in response to a broad range of excitation voltages. The cathodoluminescent layer is substantially free of any conductive inert materials that reduce the inherent luminescent efficiency of the display and the quality of the display image. The composition, device and process of the present invention will be further understood from the drawings and the following detailed description.

DESCRIPTION OF PREFERRED EMBODIMENTS

Figure 1:
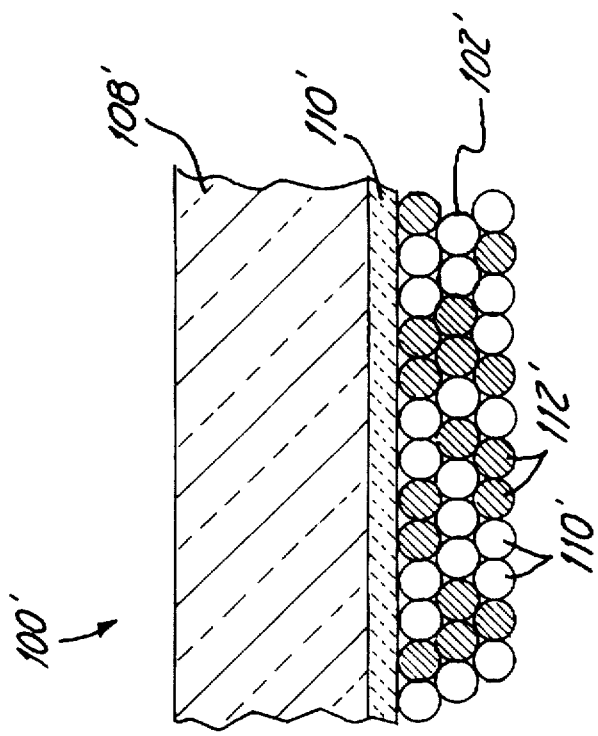
FIG. 1 is a conceptualized cross-sectional view of a display screen of the present invention.

The present invention relates to a phosphor composition and to a device and process utilizing a selected phosphor composition in a luminescent display. The phosphor composition comprises a mixture of a dielectric phosphor species and a conductive phosphor species. FIG. 1 conceptually shows the phosphor composition of the present invention as utilized in a display screen application, wherein a display screen is shown and generally designated 100. The phosphor composition is a continuous cathodoluminescent layer 102 containing dielectric phosphor particles 104 and conductive phosphor particles 106 that is coated onto a transparent substrate 108. An intervening transparent conductive electrode layer 110 formed from a conventional non-luminescent conductive material, such as indium tin oxide, is also coated onto the transparent substrate 108 between the substrate 108 and the cathodoluminescent layer 102. The transparent substrate 108 is preferably formed from a continuous sheet of transparent, high-strength, nonconductive material, such as glass, that is capable of supporting the cathodoluminescent layer 102 and transparent conducting electrode layer 110.

Green light-emitting dielectric phosphor species having utility herein include $[Y_2O_3$: Tb, $Y_3Al_5O_{12}$: Tb, $Y_3(Al,Ga)_5O_{12}$: Tb, $Zn_2SiO_4$: Mn, $Gd_2O_3$: Tb, $Y_2SiO_5$: Tb, LaOCl: Tb,] $Y_2O_3$:Tb; $Y_3Al_5O_{12}$:Tb: $Y_3(Al,Ga)_5O_{12}$:Tb; $Zn_2SiO_4$: Mn: $Gd_2O_3$: Tb; $Y_2SiO_5$: Tb; LaOCl: Tb; and mixtures thereof. Blue light-emitting dielectric phosphor species having utility herein include $[Y_2SiO_5$: Ce, $Zn_2SiO_4$: Ti,] $Y_2SiO_5$: Ce: $Zn_2SiO_4$:Ti: and mixtures thereof. Red light-emitting dielectric phosphor species having utility herein include $[Y_2O_3$: Eu, $YVO_4$:Eu, gamma-$Zn_3(PO_4)_2$:Mn,] $Y_2O_3$:Eu:$YVO_4$:EU: gamma-$Zn_3(PO_4)_2$:Mn: and mixtures thereof. Other known green, blue and red light-emitting, dielectric phosphor species may also have utility herein, such as dielectric sulfide or oxysulfide phosphor species for certain specific display applications, as can readily be determined by the skilled artisan in conjunction with the instant teaching. For example, alternate green light-emitting dielectric phosphor species having utility herein include [ZnS:Cu, ZnCdS:Cu, ZnS:Cu,Al, ZnCdS:Cu,Al, $Gd_2O_2S$:Tb, $Y_2O_2S$:Tb,] ZnS:Cu: (Zn,Cd)S:Cu: ZnS:Cu, Al; (Zn,Cd)S:Cu,Al: $Gd_2O_2S$:Tb: $Y_2O_2S$:Tb: and mixtures thereof. Alternate blue light-emitting dielectric phosphor species having utility herein include ZnS:Ag [pigmented, ZnS:Cu, Al, ZnS:Cu, Ga, Cl,] (pigmented); ZnS:Cu,Al: ZnS:Cu,Ga, Cl; and mixtures thereof Alternate red light-emitting dielectric phosphor species having utility herein include $Y_2O_2S$:Eu.

Referring again to the phosphor composition of the present invention as shown in FIG. 1, a dielectric phosphor species is defined herein as a luminescent composition having an electrical resistivity of at least about $1\times10^9$ ohm·cm and preferably at least about $1\times10^{11}$ ohm·cm at 25° C. The dielectric phosphor species is a phosphor species that emits visible green, blue or red light when subjected to excitation electrons having a relatively high working voltage value. The relatively high working voltage value is between about 500 volts and about 30,000 volts or higher, and preferably between about 5,000 volts and about 20,000 volts. The working voltage is defined herein as the voltage at which a given phosphor achieves stable and efficient luminescence, whereas the threshold voltage is defined as the minimum voltage at which a given phosphor luminesces. The threshold voltage, which is considerably lower than the working voltage, produces neither stable nor efficient luminescence and as such has little utility with respect to the instant invention.

Green light-emitting dielectric phosphor species having utility herein include $[Y_2O_3$:Tb, $Y_3Al_5O_{12}$:Tb, $Y_3(Al,Ga)_5O_{12}$:Tb, $Zn_2SiO_4$:Mn, $Gd_2O_3$:Tb, $Y_2SiO_5$:Tb, LaOCl:Tb,] $Y_2O_3$:Tb; $Y_3Al_5O_{12}$:Tb; $Y_3(Al,GA)_5O_{12}$:Tb; $Zn_2SiO_4$: $Gd_2O_3$: Tb; $Y_2SiO_5$:Tb: LaOC1:Tb: and mixtures thereof. Blue light-emitting dielectric phosphor species having utility herein include $[Y_2SiO_5$:Ce, $Zn_2SiO_4$:Ti,] $Y_2SiO_5$:Ce: $Zn_2SiO_4$:Ti: and mixtures thereof. Red light-emitting dielectric phosphor species having utility herein include $[Y_2O_3$:Eu, $YVO_4$:Eu, gamma-$Zn_3(PO_4)_2$:Mn,] $Y_2O_3$:Eu:$YVO_4$:EU: gamma-$Zn_3(PO_4)_2$:Mn: and mixtures thereof. Other known green, blue and red light-emitting, dielectric phosphor species may also have utility herein, such as dielectric sulfide or oxysulfide phosphor species for certain specific display applications, as can readily be determined by the skilled artisan in conjunction with the instant teaching. For example, alternate green light-emitting dielectric phosphor species having utility herein include [ZnS:Cu, ZnCdS:Cu, ZnS:Cu,Al, ZnCdS:Cu,Al, $Gd_2O_2S$:Tb, $Y_2O_2S$:Tb,] ZnS:Cu: (Zn,Cd)S:Cu: ZnS:Cu, Al; (Zn,Cd)S:Cu,Al: $Gd_2O_2S$:Tb: $Y_2O_2S$:Tb: and mixtures thereof. Alternate blue light-emitting dielectric phosphor species having utility herein include ZnS:Ag [pigmented, ZnS:Cu, Al, ZnS:Cu, Ga, Cl,] (pigmented); ZnS:Cu,Al: ZnS:Cu,Ga, Cl; and mixtures thereof Alternate red light-emitting dielectric phosphor species having utility herein include $Y_2O_2S$:Eu.

A conductive phosphor species is defined herein as a luminescent composition having an electrical resistivity of less than about $1\times10^5$ ohm·cm and preferably less than about $1\times10^3$ ohm·cm at 25° C. The conductive phosphor species is a phosphor species that emits visible green, blue or red light when subjected to excitation electrons having a relatively low working voltage value. The relatively low working voltage value is between about 10 volts and about 2,000 volts, and preferably between about 80 volts and about 800 volts. The green light-emitting conductive phosphor species employed in the phosphor composition of the present invention is selected from the group consisting of ZnO:Zn; $ZnGa_2O_4$:Mn; and mixtures thereof. The blue light-emitting conductive phosphor species is selected from the group consisting of $ZnGa_2O_4$ (undoped); (Zn,Mg)O:Zn, and mixtures thereof. The red light-emitting conductive phosphor species is selected from the group consisting of $SnO_2$:Eu; $CaTiO_3$:Pr; and mixtures thereof. Other known green, blue and red light-emitting conductive phosphor species may also have utility herein, as can readily be determined by the skilled artisan in conjunction with the instant teaching. The molar ratio of the dielectric phosphor species to the conductive phosphor species in the phosphor composition is between about 10:1 and about 1:10, and preferably between about 2:1 and about 1:1.

The phosphor composition is preferably prepared by separately preparing the dielectric phosphor species and the conductive phosphor species in solid form and thereafter fully mixing the dielectric phosphor species and the conductive phosphor species in relative amounts to obtain a phosphor composition having a desired molar ratio within the above-recited range. The dielectric phosphor species and the conductive phosphor species are prepared from precursor materials of one or more selected host lattices and, in most cases, one or more selected dopants in accordance with methods well known to the skilled artisan.

Figure 3:
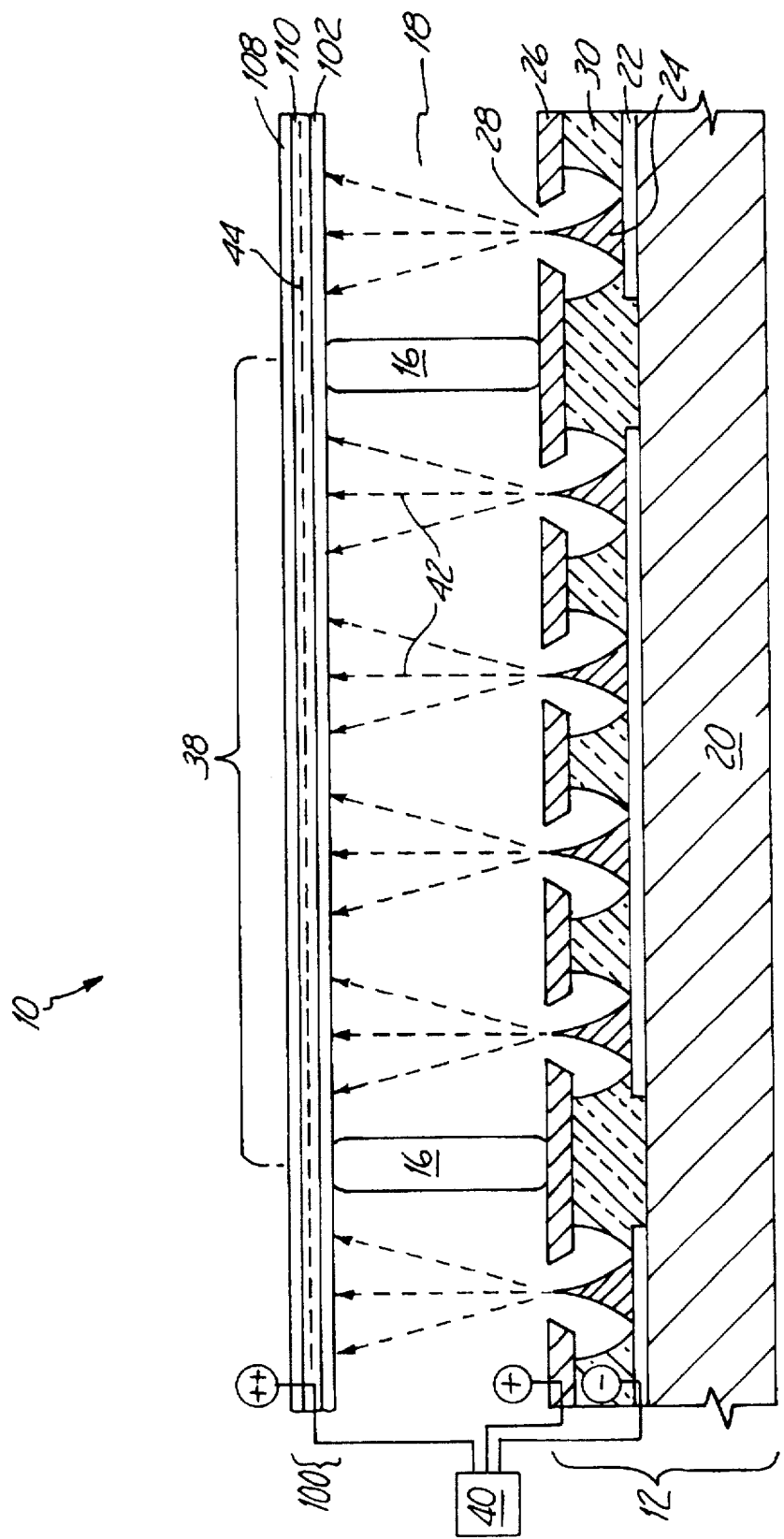
FIG. 3 is a schematic cross-sectional view of a field emission display to which the present invention is applicable.

The device and process of the present invention are described hereafter with reference to FIG. 3, wherein a field emission display having a cold cathode is schematically depicted. The components of the field emission display common to those of the display screen shown in FIG. 1 are identified by the same reference characters. The field emission display is generally designated 10 and is substantially the same as the field emission display shown and described in U.S. Pat. No. 5,232,549, incorporated herein by reference, with the exception of the composition of the display screen, alternately termed the faceplate, as described hereafter. The present field emission display 10 comprises a baseplate 12 and a faceplate 100 separated by a plurality of spacers 16. The spacers 16 are provided to hold off external atmospheric pressure because the entire interior volume of the display 10 including the voidspace 18 between the baseplate 12 and the faceplate 100 is evacuated to high vacuum. The baseplate 12 is a laminate including a continuous, substantially non-conductive substrate 20 having a cathode layer 22 deposited thereon. A plurality of emitter tips 24 are periodically positioned about the surface of the cathode layer 22 in an array. A grid 26 is positioned above the emitter tips 24. A gate opening 28 is formed in the grid 26 at each emitter tip 24. The grid 26 is maintained above the emitter tips 24 by means of an insulative layer 30 interspersed on the cathode layer 22 between each emitter tip 24.

The faceplate 100 comprises a transparent substrate 108 having a cathodoluminescent layer 102 and a transparent conducting electrode layer 110 deposited on its underside at the interface between the faceplate 100 and the voidspace 18. The cathodoluminescent layer 102 consists essentially of the phosphor composition of the present invention as described above comprising a mixture of a dielectric phosphor species and a conductive phosphor species. The transparent conducting electrode layer 110 is made up of transparent conductive materials well known in the art, such as indium tin oxide (ITO), and serves as an anode to the cathode layer 22 as will be described hereafter. The faceplate 100 is segmented into a plurality of pixels 38 one of which is shown in its entirety in FIG. 3. An electron source 40 is provided in electrical communication with the cathode layer 22, the grid 26 and the conducting electrode layer 110, respectively.

To operate the field emission display 10, the electron source 18 is selectively activated with respect to each pixel 38, thereby applying a voltage differential between the cathode layer 22 and the grid 26 as well as between the grid 26 and the conducting electrode layer 110. This voltage differential is within the above-recited excitation range of the dielectric and conductive phosphor species of the cathodoluminescent layer 102 and causes the emitter tips 24 to emit a stream of excitation electrons 42 through the gate openings 28 across the voidspace 18 to the cathodoluminescent layer 102. The excitation electrons 42 impart their energy to the phosphor composition of the cathodoluminescent layer 102, exciting either one or both of the dielectric phosphor species and the conductive phosphor species and causing the phosphor composition to emit photons that are visible as green, blue or red light to a viewer through the transparent substrate 108. By selectively activating and deactivating the pixels 38 of the display 10 in a manner known to the skilled artisan, different images can be created on the faceplate 100.

Spent electrons 44 result from the transfer of energy to the cathodoluminescent layer 102 which are retained on the faceplate 100 creating an undesirable charge build-up thereon. Accordingly, the spent electrons 44 are conducted by the cathodoluminescent layer 102, and in particular by the conductive phosphor species of the phosphor composition, through the cathodoluminescent layer 102 to the conducting electrode layer 110 where the spent electrons 44 are discharged, thereby diminishing the charge build-up on the faceplate 100.

While forgoing preferred embodiments of the invention have been described and shown, it is understood that alternatives and modifications, such as those suggested and others, may be made thereto and fall within the scope of the invention. In particular, it is noted that although the present invention is described above in the context of its application to field emission displays, it is apparent to the skilled artisan that the present phosphor composition is generally applicable to other luminescent display. It is also apparent that the present device and process are applicable to displays other than field emission displays and, in particular, are applicable to vacuum fluorescent displays.

We claim:

1. A phosphor composition for a luminescent device comprising:

a dielectric phosphor species selected from the group consisting of $Y_2O_3$:Tb; $Y_3Al_5O_{12}$:Tb; $Y_3(Al,Ga)_5O_{12}$:Tb; $Gd_2O_3$:Tb; $Y_2SiO_5$:Tb; LaOCl: Tb; (Zn, Cd)S:Cu; (Zn,Cd)S:Cu,Al; $Gd_2O_2S$:Tb; $Y_2O_2S$:Tb; $Y_2SiO_5$:Ce; $Zn_2SiO_4$:Ti; ZnS:Cu, Ga,Cl; $Y_2O_3$:Eu; $YVO_4$:Eu; gamma-$Zn_3(PO_4)_2$:Mn; and mixtures thereof; and a conductive phosphor species selected from the group consisting of ZnO:Zn; $ZnGa_2O_4$:Mn; $ZnGa_2O_4$ (undoped); (Zn,Mg)O:Zn; $CaTiO_3$:Pr; and mixtures thereof.

2. A phosphor composition as recited in claim 1 substantially free of any luminescently inert material.

3. A phosphor composition for a luminescent device comprising:

a dielectric phosphor species selected from the group consisting of $Y_2O_3$:Tb; $Y_3Al_5O_{12}$:Tb; $Y_3(Al,Ga)_5O_{12}$:Tb; $Gd_2O_3$:Tb; $Y_2SiO_5$:Tb; LaOCl:Tb; (Zn,Cd)S:Cu; (Zn,Cd)S:Cu,Al; $Gd_2O_2S$:Tb; $Y_2O_2S$:Tb; $Y_2SiO_5$:Ce; $Zn_2SiO_4$:Ti; ZnS:Cu,Ga,Cl; $Y_2O_3$:Eu; $YVO_4$:Eu; gamma-$Zn_3(PO_4)_2$:Mn; and mixtures thereof, and a conductive phosphor species having a working voltage of about 10 volts to about 2000 volts.

4. A phosphor composition as recited in claim 3 wherein said dielectric phosphor species and said conductive phosphor species are present in said phosphor composition in a molar ratio from about 10:1 to about 1:10.

5. A phosphor composition as recited in claim 3 which is substantially free of any conductive luminescently inert species.

6. A phosphor composition for a luminescent device comprising:

a dielectric phosphor species having a working voltage of at least about 500 volts; and a conductive phosphor species selected from the group consisting of (Zn,Mg)O:Zn; CaTiO$_3$:Pr; and mixtures thereof.

7. A phosphor composition as recited in claim 6 wherein said dielectric phosphor species and said conductive phosphor species are present in said phosphor composition in a molar ratio from about 10:1 to about 1:10.

8. A phosphor composition as recited in claim 6 which is substantially free of any conductive luminescently inert species.

9. A phosphor composition for a luminescent device comprising:

a green light-emitting dielectric phosphor species selected from the group consisting of Y$_2$O$_3$:Tb; Y$_3$Al$_5$O$_{12}$:Tb; Y$_3$(Al,Ga)$_5$O$_{12}$:Tb; Gd$_2$O$_3$:Tb; Y$_2$SiO$_5$:Tb; LaOCl:Tb; (Zn,Cd)S:Cu; (Zn, Cd)S:Cu,Al; Gd$_2$O$_2$S:Tb; Y$_2$O$_2$S:Tb; and mixtures thereof; and a green light-emitting conductive phosphor species selected from the group consisting of ZnO:Zn; ZnGa$_2$O$_4$:Mn; and mixtures thereof.

10. A phosphor composition for a luminescent device comprising:

a blue light-emitting dielectric phosphor species selected from the group consisting of Y$_2$SiO$_5$:Ce; Zn$_2$SiO$_4$:Ti; ZnS:Cu,Al; ZnS:Cu,Ga,Cl; and mixtures thereof; and a blue light-emitting conductive phosphor species selected from the group consisting of ZnGa$_2$O$_4$ (undoped); (Zn,Mg)O:Zn; and mixtures thereof.

11. A phosphor composition for a luminescent device comprising a blue light-emitting phosphor species which is ZnS:Ag (pigmented);

a blue light-emitting phosphor species which is ZnGa$_2$O$_4$ (undoped); and a blue light-emitting phosphor species selected from the group consisting of Y$_2$SiO$_5$:Ce; Zn$_2$SiO$_4$:Ti; ZnS:Cu, Al; ZnS:Cu,Ga,Cl; and (Zn,Mg)O:Zn.

12. A process for discharging spent electrons from a luminescent display comprising:

depositing a conducting electrode layer on a substrate of a luminescent display;

depositing a cathodoluminescent layer of a phosphor composition on said substrate atop said conducting electrode layer, wherein said phosphor composition comprises a dielectric phosphor species having a working voltage of at least about 500 volts; and a conductive phosphor species selected from the group consisting of (Zn,Mg)O:Zn; CaTiO$_3$:Pr; and mixtures thereof;

directing excitation electrons onto said phosphor composition, thereby causing said phosphor composition to emit visible light while converting said excitation electrons to spent electrons, wherein said excitation electrons have a higher energy level than said spent electrons; and discharging said spent electrons away from said phosphor composition by conducting said spent electrons through said phosphor composition to said conducting electrode layer by means of said conductive phosphor.

13. A process as recited in claim 12 wherein said dielectric phosphor species emits visible light of a color selected from the group consisting of green, blue, and red, and said conductive phosphor species emits visible light of said selected color when subjected to excitation electrons.

14. A process as recited in claim 12 wherein said dielectric phosphor species and said conductive phosphor species are present in said phosphor composition in a molar ratio from about 10:1 to about 1:10.

15. A process as recited in claim 12 wherein said phosphor composition is substantially free of any conductive luminescently inert species.

16. A process for discharging spent electrons from a luminescent display comprising:

depositing a conducting electrode layer on a substrate of a luminescent display;

depositing a cathodoluminescent layer of a phosphor composition on said substrate atop said conducting electrode layer, wherein said phosphor composition comprises a dielectric phosphor species selected from the group consisting of Y$_2$O$_3$:Tb; Y$_3$Al$_5$O$_{12}$:Tb; Y$_3$(Al, Ga)$_5$O$_{12}$:Tb; Gd$_2$O$_3$:Tb; Y$_2$SiO$_5$:Tb; LaOCl:Tb; (Zn, Cd)S:Cu; (Zn,Cd)S:Cu,Al; Gd$_2$O$_2$S:Tb; Y$_2$O$_2$S:Tb; Y$_2$SiO$_5$:Ce; Zn$_2$SiO$_4$:Ti; ZnS:Cu,Ga,Cl; Y$_2$O$_3$:Eu; YVO$_4$:Eu; gamma-Zn$_3$(PO$_4$)$_2$:Mn; and mixtures thereof; and a conductive phosphor species having a working voltage of about 10 volts to about 2000 volts;

directing excitation electrons onto said phosphor composition, thereby causing said phosphor composition to emit visible light while converting said excitation electrons to spent electrons, wherein said excitation electrons have a higher energy level than said spent electrons; and discharging said spent electrons away from said phosphor composition by conducting said spent electrons through said phosphor composition to said conducting electrode layer by means of said conductive phosphor.

17. A process as recited in claim 16 wherein said dielectric phosphor species and said conductive phosphor species are present in said phosphor composition in a molar ratio from about 10:1 to about 1:10.

18. A process as recited in claim 16 wherein said phosphor composition is substantially free of any conductive luminescently inert species.

19. A process as recited in claim 16 wherein said dielectric phosphor species emits visible light of a color selected from the group consisting of green, blue, and red, and said conductive phosphor species emits visible light of said selected color when subjected to excitation electrons.

20. A screen for a luminescent display comprising:

a transparent substrate;

a conducting electrode layer positioned on said substrate; and a cathodoluminescent layer of a phosphor composition positioned on said substrate atop said conducting electrode layer, wherein said phosphor composition comprises a dielectric phosphor species having a working voltage of at least about 500 volts; and a conductive phosphor species selected from the group consisting of (Zn,Mg)O:Zn; CaTiO$_3$:Pr; and mixtures thereof.

21. A screen as recited in claim 20 wherein said dielectric phosphor species emits visible light of a color selected from the group consisting of green, blue, and red, and said conductive phosphor species emits visible light of said selected color when subjected to excitation electrons.

22. A screen as recited in claim 20 wherein said dielectric phosphor species and said conductive phosphor species are present in said phosphor composition in a molar ratio from about 10:1 to about 1:10.

23. A screen as recited in claim 20 wherein said phosphor composition is substantially free of any conductive luminescently inert species.

24. A screen for a luminescent display comprising:
a transparent substrate;
a conducting electrode layer positioned on said substrate; and
a cathodoluminescent layer of a phosphor composition positioned on said substrate atop said conducting electrode layer, wherein said phosphor composition comprises a dielectric phosphor species selected from the group consisting of $Y_2O_3$:Tb; $Y_3Al_5O_{12}$:Tb; $Y_3(Al,Ga)_5O_{12}$:Tb; $Gd_2O_3$:Tb; $Y_2SiO_5$:Tb; LaOCl:Tb; (Zn,Cd)S:Cu; (Zn,Cd)S:Cu,Al; $Gd_2O_2S$:Tb; $Y_2O_2S$:Tb; $Y_2SiO_5$:Ce; $Zn_2SiO_4$:Ti; ZnS:Cu,Al; ZnS:Cu,Ga,Cl; $Y_2O_3$:Eu; $YVO_4$:Eu; gamma-$Zn_3(PO_4)_2$:Mn; and mixtures thereof; and a conductive phosphor species having a working voltage of about 10 volts to about 2000 volts.

25. A screen as recited in claim 24 wherein said dielectric phosphor species and said conductive phosphor species are present in said phosphor composition in a molar ratio from about 10:1 to about 1:10.

26. A screen as recited in claim 24 wherein said dielectric phosphor species emits visible light of a color selected from the group consisting of green, blue, and red, and said conductive phosphor species emits visible light of said selected color when subjected to excitation electrons.

27. A screen as recited in claim 24 wherein said phosphor composition is substantially free of any conductive luminescently inert species.

* * * * *

UNITED STATES PATENT AND TRADEMARK OFFICE
CERTIFICATE OF CORRECTION

PATENT NO.: 5,788,881
DATED: August 4, 1998
INVENTOR(S): Chadha et al.

It is certified that error appears in the above-identified patent and that said Letters Patent is hereby corrected as shown below:

Column 1, line 7, delete "D4BT63" and insert --DABT63--;

Column 3, lines 37-63, delete, "Green light-emitting dielectric phosphor species having utility herein include [$Y_2O_3$: Tb, $Y_3Al_5O_{12}$: Tb, $Y_3(Al,Ga)_5O_{12}$:Tb, $Zn_2SiO_4$:Mn, $Gd_2O_3$: Tb, $Y_2SiO_5$:Tb, LaOC1: Tb,] $Y_2O_3$:Tb: $Y_3Al_5O_{12}$: Tb: $Y_3(A1,Ga)_5O_{12}$: Tb; $Zn_2SiO_4$: Mn: $Gd_2O_3$: Tb; $Y_2SiO_5$: Tb; LaOC1: Tb; and mixtures thereof. Blue light-emitting dielectric phosphor species having utility herein include [$Y_2SiO_5$:Ce, $Zn_2SiO_4$: Ti,] $Y_2SiO_5$: Ce: $Zn_2SiO_4$: Ti: and mixtures thereof. Red light-emitting dielectric phosphor species having utility herein include [$Y_2O_3$: Eu, $YVO_4$: Eu, gamma-$Zn_3(PO_4)_2$: Mn,] $Y_2O_3$: EU: $YVO_4$: EU: gamma-$Zn_3(PO_4)_2$: Mn: and mixtures thereof. Other known green, blue and red light-emitting dielectric phosphor species may also have utility herein, such as dielectric sulfide or oxysulfide phosphor species for certain specific display applications, as can readily be determined by the skilled artisan in conjunction with the instant teaching. For example, alternate green light-emitting dielectric phosphor species having utility herein include [ZnS: Cu, ZnCdS: Cu, ZnS: Cu,Al,ZnCdS: Cu,Al, $Gd_2O_2$S:Tb, $Y_2O_2$S:Tb,] ZnS:Cu: (Zn,Cd)S:Cu: ZnS:Cu, Al; (Zn,Cd)S:Cu,Al: $Gd_2O_2$S:Tb: $Y_2O_2$S:Tb: and mixtures thereof. Alternate blue light-emitting dielectric phosphor species having utility herein include ZnS:Ag [pigmented,ZnS:Cu, Al, ZnS:Cu, Ga, Cl,] (pigmented): ZnS:Cu, Al: ZnS: Cu, Ga, Cl; and mixtures thereof. Alternate red light-emitting dielectric phosphor species having utility herein include $Y_2O_2$S:Eu."

and insert,

--It is noted that the phosphor composition of the present invention is substantially free of any inert species and, in particular, substantially free of any non-luminescent conductors such as indium oxide or zinc oxide. An inert species is defined herein as a composition that does not luminesce when subjected to excitation electrons that would

UNITED STATES PATENT AND TRADEMARK OFFICE
CERTIFICATE OF CORRECTION

PATENT NO.: 5,788,881
DATED: August 4, 1998
INVENTOR(S): Chadha et al.

Figure 2:
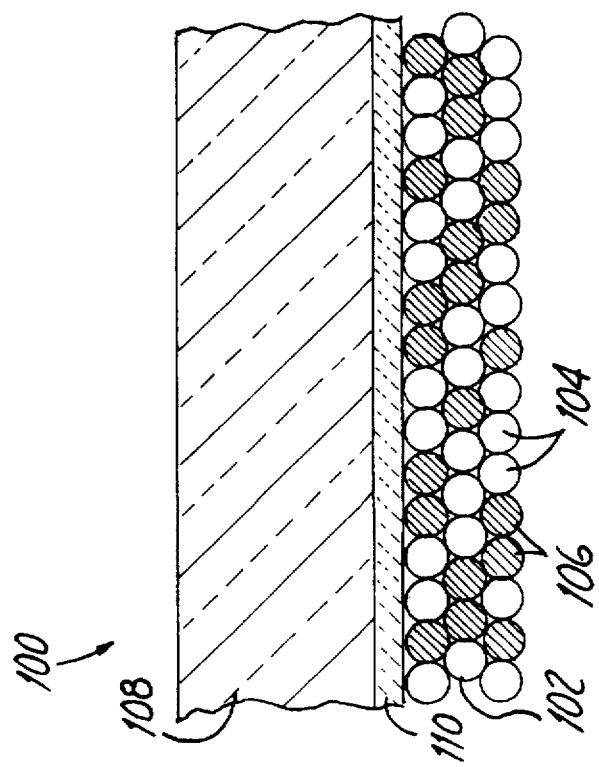
FIG. 2 is a conceptualized cross-sectional view of a display screen of the prior art.

It is certified that error appears in the above-identified patent and that said Letters Patent is hereby corrected as shown below:

cause the dielectric or conductive phosphor species of the present invention to luminesce. In contrast to the phosphor composition of the present invention, Figure 2 conceptually shows a prior art phosphor composition as utilized in a display screen application, wherein a display screen is shown and generally designated 100'. The display screen 100' of the prior art also has a transparent substrate 108' as well as a continuous cathodoluminescent layer 102' containing the prior art phosphor composition and an intervening transparent conductive electrode layer 110'. The prior art phosphor composition of the cathodoluminescent layer 102', however, supplements the dielectric phosphor particles 104' with conductive non-luminescent particles 112' rather than the conductive phosphor particles of the instant invention. The conductive nonluminescent particles 112' are formed from an inert species such as indium oxide or zinc oxide.--;

Column 4, line 17-18, delete, "[$Y_2O_3$:Tb, $Y_3Al_5O_{12}$:Tb, $Y_3(Al,Ga)_5O_{12}$:Tb, $Zn_2SiO_4$:Mn, $Gd_2O_3$:Tb: $Y_2SiO_5$:Tb, LaOC1:Tb,]";

Column 4, line 19, delete "$(A1,GA)_5O_{12}$" and insert --$(Al,Ga)_5O_{12}$--;

Column 4, line 19, delete "$Zn_2SiO_4$:" and insert --$Zn_2SiO_4$:Mn;--;

Column 4, line 20, delete "LaOC1:" and insert --LaOCl:--;

Column 4, line 22, delete "[$Y_2SiO_5$:Ce, $Zn_2SiO_4$:Ti,]";

Column 4, line 23, delete "$SiO_4$:Ti:" and insert --$SiO_4$:Ti;--;

Column 4, line 25, delete "[$Y_2O_3$:Eu, $YVO_4$:Eu, gamma-$Zn_3(PO_4)_2$:Mn,]"

Column 4, line 26, delete "Eu:$YVO_4$:EU:" and insert --Eu;$YVO_4$:Eu;--;

UNITED STATES PATENT AND TRADEMARK OFFICE
CERTIFICATE OF CORRECTION

PATENT NO. : 5,788,881
DATED : August 4, 1998
INVENTOR(S) : Chadha et al

It is certified that error appears in the above-identified patent and that said Letters Patent is hereby corrected as shown below:

Column 4, line 26, delete "Mn:" and insert --Mn;--;

Column 4, line 27, delete "light-emitting," and insert --light-emitting--;

Column 4, lines 33-35, delete "[ZnS:Cu, ZnCdS:Cu, ZnS:Cu,Al, ZnCdS:Cu,Al, $Gd_2O_2S$:Tb,$Y_2O_2$S:Tb,] ZnS:Cu: (Zn,Cd)S:Cu: ZnS:Cu, Al;" and insert --ZnS:Cu; (Zn,Cd)S:Cu; ZnS:Cu, Al;--;

Column 4, line 36, delete "S:Cu,Al: $Gd_2O_2S$:Tb: $Y_2O_2S$:Tb:" and insert --S:Cu,Al; $Gd_2O_2S$:Tb; $Y_2O_2S$:Tb;--;

Column 4, line 38-39, delete "[pigmented, ZnS:Cu,Al, ZnS;Cu, Ga, Cl,]";

Column 4, line 40, delete "thereof" and insert --thereof.--;

Signed and Sealed this

Twenty-sixth Day of September, 2000

Attest:

Attesting Officer

Q. TODD DICKINSON
*Director of Patents and Trademarks*